L. B. DOE.
DRAFT DEVICE.
APPLICATION FILED JULY 9, 1918
1,336,735. Patented Apr. 13, 1920.
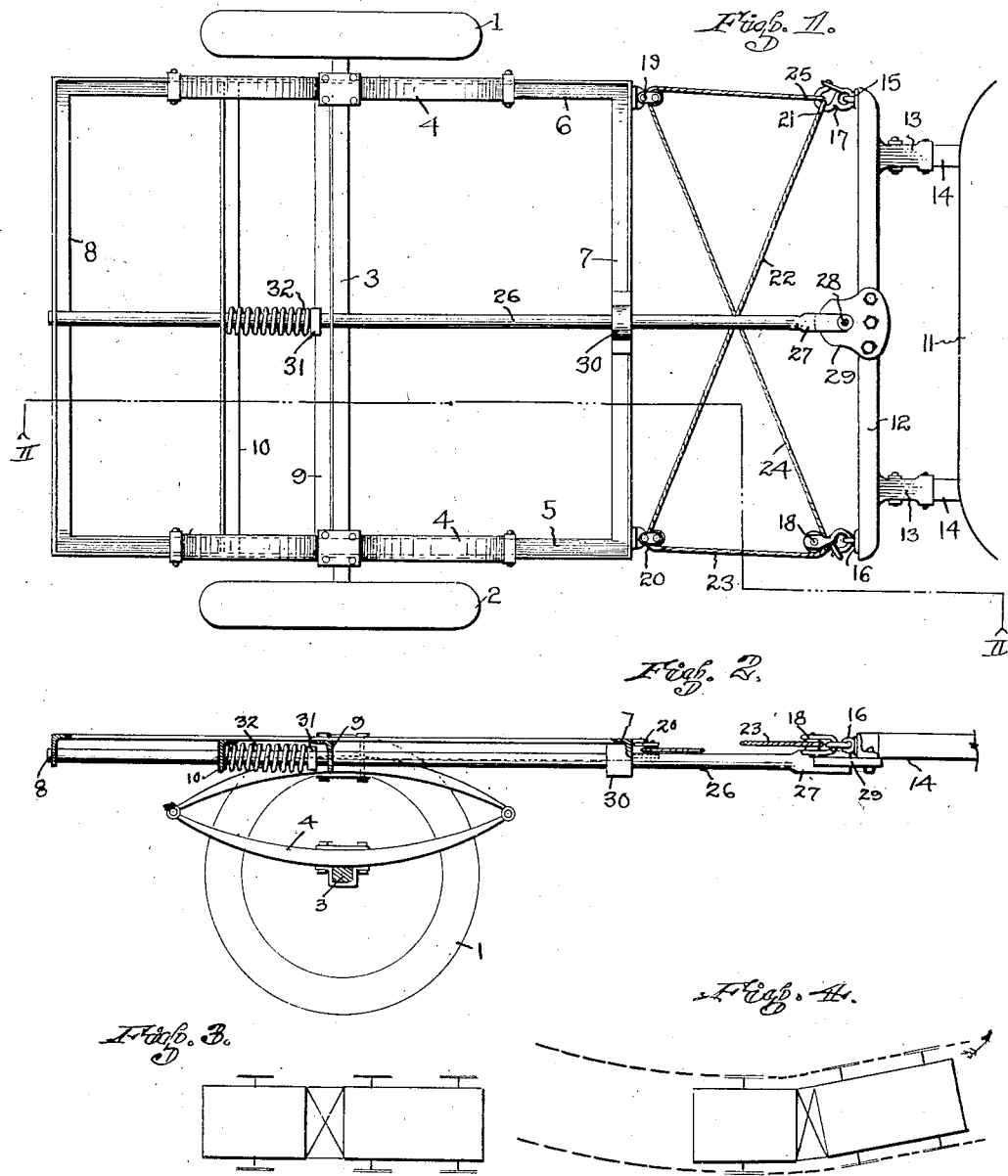
WITNESS
Lincol D Johnson
INVENTOR
LORING B. DOE
BY
Baldwin Yale
ATTORNEY

UNITED STATES PATENT OFFICE.

LORING B. DOE, OF SAN FRANCISCO, CALIFORNIA, ASSIGNOR OF ONE-HALF TO EDWARD G. LEWIS, OF SAN FRANCISCO, CALIFORNIA.

DRAFT DEVICE.

1,336,735.　　　　Specification of Letters Patent.　　Patented Apr. 13, 1920.

Application filed July 9, 1918. Serial No. 244,088.

*To all whom it may concern:*

Be it known that I, LORING B. DOE, a citizen of the United States, and a resident of the city and county of San Francisco, State of California, have made a new and useful Invention—to wit, Improvements in Draft Devices; and I do hereby declare the following to be a full, clear, concise, and exact description of the same.

The invention relates particularly to the form of hitch for trailers adapted to be towed behind automobiles or other driven vehicles.

Among the objects of the invention are to provide a trailer that will track in alinement behind the vehicle towing it; that will tow without sidesway or yawing, and is easily detached from the towing vehicle; that is simple and strong in construction and operation. Other objects and advantages will appear as this description progresses.

In this specification and the annexed drawings, the invention is illustrated in the form considered to be the best, but it is to be understood that the invention is not limited to such form because it may be embodied in other forms, and it is also to be understood that in and by the claims following the description, it is desired to cover the invention in whatever form it may be embodied.

In the accompanying one sheet of drawings:

Figure 1 is a plan view of a trailer constructed and attached to a towing vehicle in accordance with this invention as viewed from underneath.

Fig. 2 is a side elevation of the same partly in cross section shown on the line II—II of Fig. 1.

Fig. 3 is a reduced diagrammatic view illustrating the trailer being towed straight behind the towing vehicle.

Fig. 4 is a similar view showing the train rounding a curve, also illustrating the preliminary position preparatory to backing up to the left.

In detail the construction illustrated in the drawings includes: a trailer having the wheels 1, 2 mounted upon the axle 3 to which the supporting springs 4—4 are fixed. The main frame of the trailer preferably comprises the sill bars 5—6 and the end bars 7—8, preferably composed of angle iron suitably joined at the corners, and provided with the cross braces 9 and 10 having their ends fixed to the sills 5 and 6.

The towing vehicle 11, hereinafter called the tractor, is provided with the draw bar 12 having the brackets 13—13 fixed to the frame 14 or other convenient part of the tractor. The opposite ends of the draw bar 12 are provided with the eye-bolts 15—16 that respectively receive the snap hook 17 and the snatch block 18 provided with a hook engaging the eye-bolt 16. The opposite corners of the forward end of the trailer are provided with the pulleys 19—20. The draft coupling consists of a flexible connection, preferably a cable, having its end 21 engaging the hook 17 and passing obliquely rearward and reeved through the pulley 20, thence forward at 23 and reeved through the block 18, thence obliquely rearward and reeved through the pulley 19, thence forward and having its end 25 attached to the hook 17. The oblique lengths 22 and 24 cross in the center of the line of draft, which is the longitudinal line through the center of the tractor and the trailer intermediate between the wheels thereof.

The guiding tongue 26 is located in the line of draft, its forward end being provided with a split clevis 27 pivotally connected by the coupling pin 28 engaging the clevis plate 29 fixed to the draw bar 12. The tongue 26 is guided in a bracket 30 fixed to the front bar 7 of the tractor frame and freely guided through holes in the cross braces 9—10 and the rear cross bar 8, in all of which it slides freely.

No draft strain comes on the tongue 26, its function being wholly involved in maintaining horizontal alinement and in the backing up operation, or in taking the forward thrust of the trailer. A set collar 31 is adjustably fixed on the tongue 26 and provides an abutment for the spiral spring 32 encircling the tongue 26 between the collar 31 and the cross brace 10.

This invention operates substantially as follows: When the tractor 11 moves forward in a straight line, the whole draft tension is on the cable at both sides extending from the hook 17 to the pulley 19, and from the pulley 20 to the hook 16, and transversely through the crossed lengths 22—24. The trailer being maintained in a horizontal position by the engagement of the tongue 26 with the plate 29, the trailer follows perfectly in alinement and entrack with the tractor. When the tractor turns the corner to the left, as in Fig. 4, the distance between 15 and 19 shortens and the distance between 16 and 20 correspondingly lengthens, the cable running through the pulleys 19, 20 and the block 18 to compensate for the variations in distance between the opposite ends of the front bar 7 of the trailer and the draft bar 12 of the tractor. The strain, however, remains uniform throughout the length of the cable, with the result that the pull between the draft bar 12 and the front 7 of the trailer is uniform at both sides, irrespective of the angle that the trailer may take to the line of draft, insuring a steady forward movement of the trailer. If the tractor turns in the opposite direction, that is to the right, the conditions are reversed, but the mode of operation is the same. When the tractor slows up on the level or down grade, the trailer moves forward toward the tractor, bringing the cross brace 10 in contact with the end of the spring 32 forcing it against the set collar 31, compressing the spring 32 which acts as a buffer for arresting the forward movement of the trailer, slacking off the cable hitch and throwing the strain on the pin 28 through the tongue 26. The same condition arises in backing up, except that the collar on the tongue 26 moves rearward, toward the cross brace 10, thus compressing the spring 32 and forcing the trailer backward.

If the train has been moving forward with the trailer directly in line of draft and it is desired to back up to the left, it is necessary to turn the tractor 11 to the left and continue forward a sufficient distance to put the line of the tongue at an angle to the line of draft, in the present instance it is converging therefrom to the left, as indicated in Fig. 4. The next operation is to back up the tractor, which will cause the trailer also to back up in a curve represented by the heavy dotted lines, Fig. 4, the axle 3 of the trailer and the rear axle of the tractor converging toward a common center on different radii, thus causing a circular movement around the center. If it is desired to back up to the right, the same operation is performed except that the tractor is turned off to the right before stopping to back. The flexible hitch plays no part in the backing up operation, inasmuch as it is slacked off and the load is transferred to the spring 32 as described in the backing up operation.

When it is desired to detach the trailer from the tractor the ends 21 and 25 of the cable are removed from the hook 17, and the snatch-block 18 is removed from the eye bolt 16 and the pin is removed from the clevis, this completely detaching the trailer from the tractor, which is then free to move independently. It is desirable to have the tongue 26 long as shown so that the trailer may be spaced backward from the tractor by moving the set collar 31 to accommodate long loads, such as lumber, on the trailer; this requires also a proportionate length addition to the cable hitch.

While I have shown and described a two-wheeled trailer it is obvious that a four wheeled trailer having a fifth wheel, which is common to all four wheeled wagons using the trailer as the front truck will behave in the same manner as that described, and that the trailers may be multiplied to the towing capacity of the tractor without departing from the spirit of this invention.

Having thus described my invention, what I claim and desire to secure by Letters Patent is:

1. A trailer hitch comprising a flexible member extending between the trailer and the tractor on both sides thereof; and crossing obliquely between said sides.

2. A trailer hitch comprising a flexible member extending longitudinally between the corners of the trailer and a tractor on both sides thereof and crossing obliquely between the opposite corners of said trailer and tractor.

3. A trailer hitch comprising connecting means attachable to the opposite corners of a trailer and a tractor; a flexible member slidably engaging said connecting means and extending longitudinally between the adjacent corners of said trailer and tractor on both sides thereof and crossed obliquely between the said connecting means on one side of the trailer to the connecting means on the opposite side of the said tractor, respectively.

4. A trailer hitch comprising a flexible member extending between the trailer and the tractor on both sides thereof, and crossing obliquely between said sides; and a nondraft tongue extending between said trailer and tractor.

5. A trailer hitch comprising a flexible member extending longitudinally between the corners of the trailer and a tractor on both sides thereof and crossing obliquely between the opposite corners of said trailer and tractor; and a non draft tongue extending between said trailer and tractor.

6. A trailer hitch comprising a flexible connecting means attachable to the opposite corners of a trailer and a tractor; a flexible member slidably engaging said connecting means and extending longitudinally between the adjacent corners of said trailer and tractor on both sides thereof and crossed obliquely between the said connecting means on one side of the trailer to the connecting means on the opposite side of the said tractor, respectively; and a non draft tongue extending between said trailer and tractor.

7. A trailer hitch comprising a flexible means extending between the trailer and the tractor on both sides thereof and crossing obliquely between said sides; and a non draft tongue pivotally engaging said tractor and slidably engaging said trailer.

8. A trailer hitch comprising a draft bar attachable to a tractor and having connecting means at opposite ends and a clevis connection intermediate its ends; connecting means at the opposite sides of said trailer; a flexible member slidably engaging said connecting means and extending longitudinally between the adjacent corners of said trailer and tractor on both sides thereof and crossed obliquely between the said connecting means on one side of the trailer to the said connecting means on the opposite side of the tractor respectively; and a tongue engaging said trailer and said clevis.

9. A trailer hitch comprising a flexible member extending between the trailer and the tractor on both sides thereof and crossing obliquely between said sides for drawing said trailer in one direction and means pivoted to said tractor and slidably engaging said trailer for moving said trailer in the opposite direction.

10. A trailer hitch comprising a flexible means extending between the trailer and tractor on both sides thereof and crossing obliquely between said sides for drawing said trailer in one direction and resilient means pivotally engaging said tractor and slidably engaging said trailer for moving said trailer in the opposite direction.

In testimony whereof, I have hereunto set my hand at San Francisco, California, this 2d day of July, 1918.

LORING B. DOE.

In presence of—
BALDWIN VALE,
LINCOLN C. JOHNSON.